(12) United States Patent
Mizude et al.

(10) Patent No.: US 8,366,096 B2
(45) Date of Patent: Feb. 5, 2013

(54) DOCUMENT READER

(75) Inventors: Kazuhiro Mizude, Osaka (JP); Kenji Tanaka, Osaka (JP); Hideyuki Hiro, Osaka (JP); Daisuke Mukaiyama, Osaka (JP); Tomohiko Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 12/492,308

(22) Filed: Jun. 26, 2009

(65) Prior Publication Data

US 2010/0001453 A1 Jan. 7, 2010

(30) Foreign Application Priority Data

Jul. 4, 2008 (JP) ................... 2008-175700

(51) Int. Cl.
*B65H 5/22* (2006.01)
*B65H 83/00* (2006.01)
*B65H 85/00* (2006.01)

(52) U.S. Cl. ..................... 271/3.14; 271/4.03; 271/3.15; 271/3.16; 271/3.17

(58) Field of Classification Search ................. 271/3.14, 271/3.15, 3.16, 3.17, 4.03, 110, 117, 118
See application file for complete search history.

(56) References Cited

U.S. PATENT DOCUMENTS

| | | | | |
|---|---|---|---|---|
| 5,209,465 A | * | 5/1993 | Sayama et al. | 271/110 |
| 6,206,359 B1 | * | 3/2001 | Hirota et al. | 271/3.15 |
| 6,393,251 B2 | * | 5/2002 | Kono | 399/370 |
| 7,342,693 B2 | | 3/2008 | Morisaki | |
| 7,578,504 B2 | * | 8/2009 | Tsai et al. | 271/301 |
| 7,717,423 B2 | * | 5/2010 | Litman et al. | 271/273 |
| 2004/0212138 A1 | * | 10/2004 | Kakuta et al. | 271/3.14 |
| 2007/0080490 A1 | * | 4/2007 | Tu | 271/3.14 |
| 2008/0111293 A1 | * | 5/2008 | Shingai | 271/3.14 |
| 2008/0169596 A1 | * | 7/2008 | Wu | 271/3.14 |
| 2009/0085280 A1 | * | 4/2009 | Litman et al. | 271/186 |
| 2009/0322011 A1 | * | 12/2009 | Kusama | 271/3.14 |

FOREIGN PATENT DOCUMENTS

| | | |
|---|---|---|
| JP | 2001-343792 | 12/2001 |
| JP | 2003-076246 | 3/2003 |
| JP | 2004-304245 | 10/2004 |
| JP | 2008-011556 | 1/2008 |

* cited by examiner

*Primary Examiner* — Kaitlin Joerger
*Assistant Examiner* — Prasad V Gokhale
(74) *Attorney, Agent, or Firm* — Renner, Otto, Boisselle & Sklar, LLP

(57) ABSTRACT

A document reader has a main conveying path, an auxiliary conveying path, a pickup roller, a first conveying roller, and a second conveying roller. The auxiliary conveying path runs between a first connection point and a second connection point on the main conveying path. The cylindrical surface of the first conveying roller is located partially on the main conveying path and partially on the auxiliary conveying path. While the first conveying roller is under the forward or reverse control, it rotates normally. The cylindrical surface of the second conveying roller is located partially on the main conveying path between the second connection point and a discharge position. A controller switches from the forward control selected during this mode to the reverse control, while a document being conveyed along the main conveying path is out of contact with the first conveying roller.

5 Claims, 10 Drawing Sheets

DOCUMENT READER

CROSS REFERENCE

This Nonprovisional application claims priority under 35 U.S.C. §119(a) on Patent Application No. 2008-175700 filed in Japan on Jul. 4, 2008, the entire contents of which are hereby incorporated by reference.

BACKGROUND OF THE INVENTION

A document reader which operates in a consecutive conveying mode reads the image on one side of documents consecutively (for example, refer to JP-2001-343792-A and JP-2008-11556-A). When the document reader terminates the consecutive conveying mode, the reader needs to forcedly discharge the residual documents in it while it is inhibiting documents from being fed into it.

A document reader of a certain type has a main conveying path, an auxiliary conveying path, a pickup roller, and conveying rollers. For structural simplicity, the pickup roller is interlocked with the conveying rollers. One of the conveying rollers conveys a document along the two paths. For structural simplicity, this conveying roller rotates in one direction. While documents are fed consecutively into this reader, it may be necessary to stop the feeding and force the document or documents remaining in the reader to be discharged. The forced document or documents may be wrinkled or otherwise damaged and jam the conveying path or paths.

The object of the present invention is to provide a document reader having a main conveying path, an auxiliary conveying path, a pickup roller, and conveying rollers, the pickup roller being interlocked with the conveying rollers, one of the conveying rollers being adapted to rotate in one direction and convey a document along the two paths, the reader being able to discharge the residual document or documents in it forcedly without damaging the document or documents when consecutive feeding is stopped.

SUMMARY OF THE INVENTION

A document reader according to the present invention has a main conveying path, an auxiliary conveying path, a pickup roller, a first conveying roller, a second conveying roller, and a drive controller. The main conveying path runs between a feed position and a discharge position. The auxiliary conveying path runs between a first connection point on the main conveying path and a second connection point on this path. The first connection point is located between the feed position and the second connection point. When the pickup roller is under forward control, with its cylindrical surface partially in the feed position, this roller feeds a document to the main conveying path. When the pickup roller is under reverse control, it is out of the feed position. The cylindrical surface of the first conveying roller is located partially on the main conveying path between the connection points and partially on the auxiliary conveying path. While the first conveying roller is under the forward or reverse control, it rotates normally. The cylindrical surface of the second conveying roller is located partially on the main conveying path between the second connection point and the discharge position. While the second conveying roller is under the forward control, it rotates normally. While the second conveying roller is under the reverse control, it rotates reversely. The drive controller selects the forward control in a consecutive conveying mode. When the drive controller terminates the consecutive conveying mode, the controller switches from the forward control to the reverse control, while a document being conveyed along the main conveying path is out of contact with the first conveying roller.

DETAILED DESCRIPTION OF THE INVENTION

Figure 1:
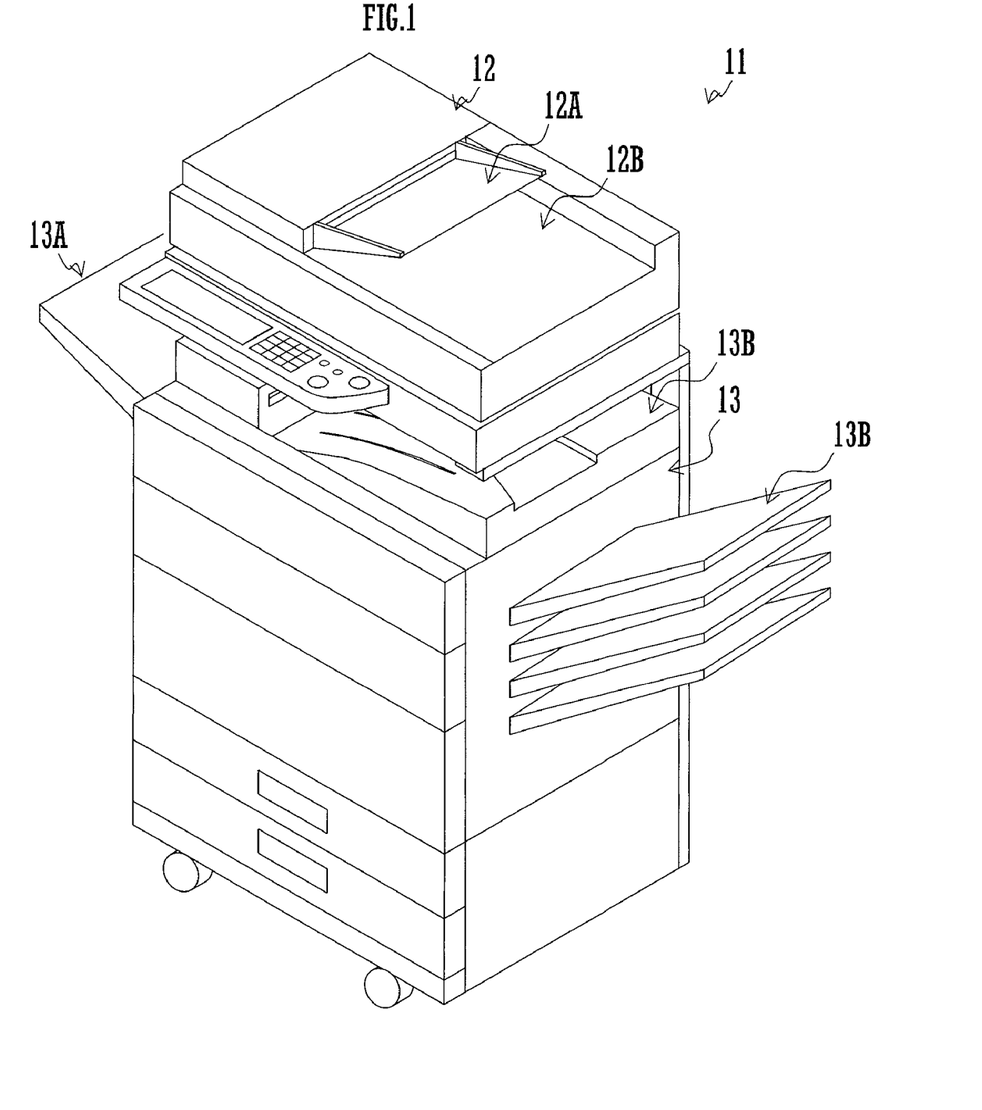
FIG. 1 is a schematic perspective view of a digital complex system including a document reader embodying the present invention.

With reference to FIG. 1, a digital complex system 11 consists essentially of a document reader 12, which embodies the present invention, and an image former 13.

The digital complex system 11 operates in a copy mode, a fax mode, or a print mode. In the copy mode, the system 11 reads the image or images on a document and prints the read image or images on a sheet of paper. In the fax mode, the system 11 reads the image on a document and transmits the read image through a public line. In the fax mode, the system 11 receives an image through a public line and prints the received image on a sheet of paper. In the print mode, the system 11 receives an image through a network and prints the received image on a sheet of paper.

The document reader 12 includes a feed tray 12A and a discharge tray 12B. The reader 12 reads the image or images on a document in the copy or fax mode. The feed tray 12A holds the document before the reader 12 reads the image or images. The discharge tray 12B holds the document after the reader 12 reads the image or images.

The image former 13 includes a feed tray 13A and discharge trays 13B. The former 13 forms an image or images on a sheet of paper in the copy or print mode. The feed tray 13A holds the sheet before the image or images are formed on the sheet. One of the discharge trays 12B holds the sheet after the image or images are formed on the sheet.

Figure 2:
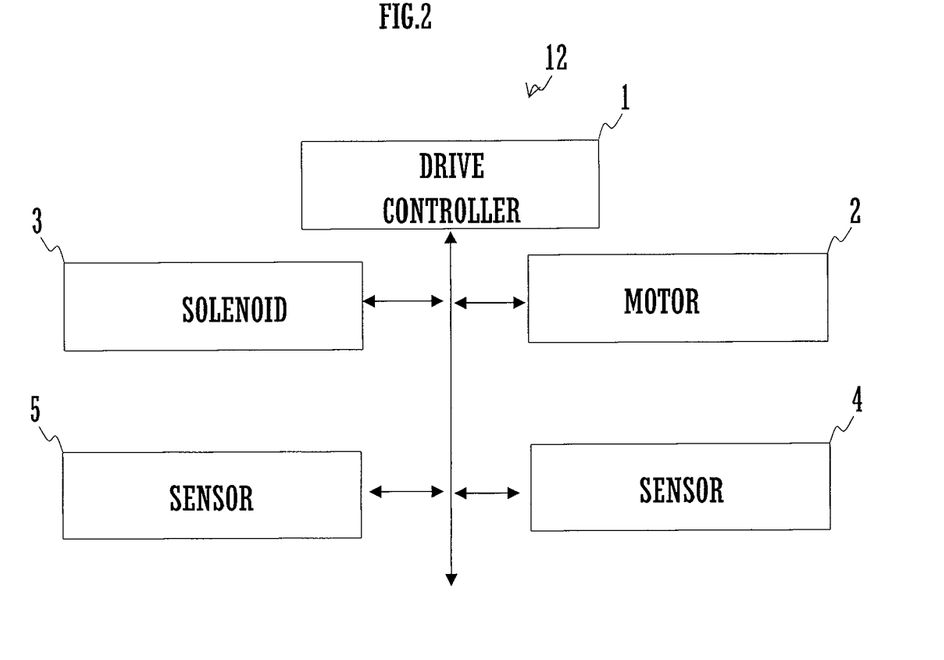
FIG. 2 is a schematic block diagram of the document reader.

With reference to FIG. 2, the document reader 12 further includes a drive controller 1, a motor 2, a solenoid 3, and two sensors 4 and 5.

Each of the sensors 4 and 5 outputs a sensor signal to the drive controller 1 while a document is positioned at a sensing position.

The drive controller 1 selects forward control, reverse control, or stop control. The controller 1 operates the motor 2 under the selected control by outputting a control signal to the motor. The controller 1 also selects ON control or OFF control. The controller 1 also operates the solenoid 3 under the selected ON or OFF control by outputting a control signal to the solenoid.

The motor 2 rotates normally while it is under the forward control. The motor 2 rotates reversely while it is under the reverse control. The motor 2 stops while it is under the stop control.

The solenoid 3 is inactivated while it is under The OFF control. The solenoid 3 is activated while it is under The ON control.

Figure 3:
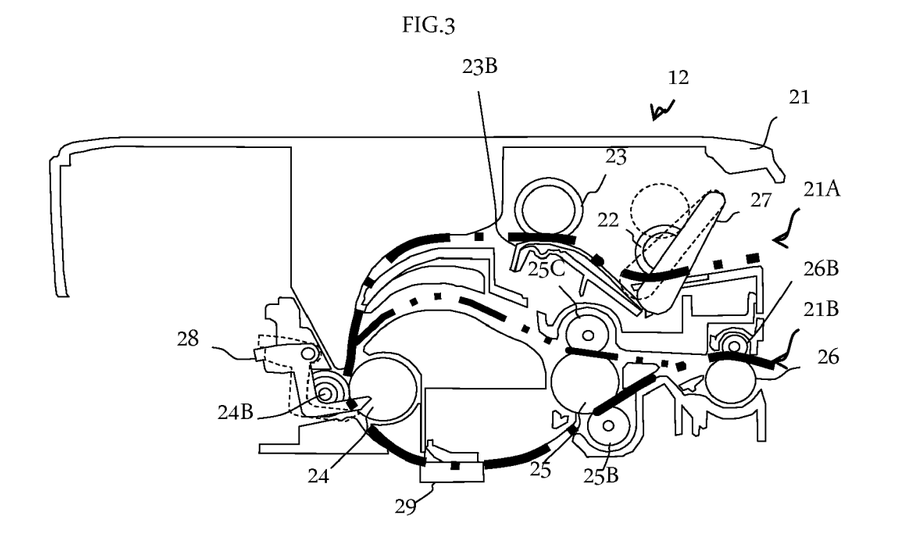
FIG. 3 is a schematic sectional view of the document reader.

With reference to FIG. 3, the document reader 12 further includes a housing 21, in which a pickup roller 22, a separating roller 23, a pressing plate 23B, three conveying rollers 24-26, four driven rollers 24B, 25B, 25C and 26B, two sensor units 27 and 28, a reading unit 29, and a platen are fitted.

The housing 21 has a feed port 21A and a discharge port 21B, to which the feed tray 12A and discharge tray 12B (FIG. 1) are fitted respectively.

A main conveying path (the one-dot chain line in FIG. 3) and an auxiliary conveying path (the two-dot chain line in FIG. 3) are formed in the housing 21. The main conveying path runs between the ports 21A and 21B. The rollers 22-26 are supported along the main conveying path in the order shown in FIG. 3. One end of the auxiliary conveying path is connected to a connection point on the main conveying path which is located between the separating roller 23 and conveying roller 24. This connection point corresponds to the first connection point of the present invention. The other end of the auxiliary conveying path is connected to a connection point on the main conveying path which is located between the conveying rollers 25 and 26. This connection point corresponds to the second connection point of the invention.

The separating roller 23 is coupled to the motor 2 through a one-way gear (not shown), which transmits torque from the motor 2 to this roller only while the solenoid 3 is inactivated, with the motor under the forward control. While the torque is transmitted through the one-way gear, the separating roller 23 rotates normally (clockwise in FIG. 3). The cylindrical surface of the separating roller 23 is in compressive contact with the pressing plate 23B on the main conveying path so that a document can be nipped between this roller and the plate. If two or more documents come one over another to the nip between the separating roller 23 and pressing plate 23B, this roller and the plate separate one from the other or others by increasing the frictional force acting between the documents. The separating roller 23 supports one end of an arm (not shown).

The pickup roller 22 is supported by the other end of the arm and rotates normally (clockwise in FIG. 3) with the separating roller 23 rotating normally. When the separating roller 23 starts to rotate, the arm shifts the pickup roller 22 from an upper position to a lower position, where the cylindrical surface of the pickup roller 22 is in compressive contact with a pressing plate on the main conveying path. When the separating roller 23 stops rotating, the arm shifts the pickup roller 22 from the lower position to the upper position.

The conveying roller 24 is coupled to the motor 2. The conveying roller 24 rotates normally (counterclockwise in FIG. 3) with the motor 2 rotating normally. The conveying roller 24 rotates reversely (clockwise in FIG. 3) with the motor 2 rotating reversely. The cylindrical surfaces of the conveying roller 24 and driven roller 24B are in compressive contact with each other on the main conveying path so that a document can be nipped between these rollers. The gear ratio in which the conveying roller 24 is coupled to the motor 2 is such that this roller conveys a document at a higher speed than the separating roller 23 does. The nipping force by which a document is nipped between the conveying roller 24 and driven roller 24B is greater than the nipping force by which a document is nipped between the separating roller 23 and pressing plate 23B. Accordingly, when one document is nipped both between the conveying roller 24 and driven roller 24B and between the separating roller 23 and pressing plate 23B, the conveying roller 24 conveys the document, pulling it from the separating roller 23.

The conveying roller 25, which corresponds to the first conveying roller of the present invention, is coupled to the motor 2 through a gear unit (not shown), which includes planet gears. Whether the motor 2 rotates normally or reversely, the gear unit makes the conveying roller 25 rotate normally (counterclockwise in FIG. 3) to convey a document at the same speed as the conveying roller 24 conveys one. The cylindrical surface of the conveying roller 25 is in compressive contact with the cylindrical surfaces of the driven rollers 25B and 25C on the main and auxiliary conveying paths respectively. This enables the conveying roller 25 to be used for the conveyance of documents along both of the paths, so that the number of conveying rollers is reduced.

The conveying roller 26, which corresponds to the second conveying roller of the present invention, is coupled to the motor 2. The conveying roller 26 rotates normally (clockwise in FIG. 3) with the motor 2 rotating normally. The conveying roller 26 rotates reversely (counterclockwise in FIG. 3) with the motor 2 rotating reversely. The cylindrical surfaces of the conveying roller 26 and driven roller 26B are in compressive contact with each other on the main conveying path so that a document can be nipped between these rollers.

The sensor unit 27 includes the sensor 4 (FIG. 2) and a pivoted member. The sensor 4 detects a document in the feed tray 12A (FIG. 1) by sensing the pivoted member in contact with the document.

The sensor unit 28, which corresponds to the detector of the present invention, includes the sensor 5 (FIG. 2) and a pivoted member. The sensor 5 detects a document between the conveying roller 24 and driven roller 24B by sensing this pivoted member in contact with the document. The drive controller 1 (FIG. 2) finds out the positions of documents 31 and 32 (FIGS. 4-8) by measuring the time having passed since the sensor unit 28 detected the arrival of the document 31 at the nip between the conveying roller 24 and driven roller 24B.

The reading unit 29 and the platen are fitted in contact with each other at a read position on the main conveying path which is between the conveying rollers 24 and 25. The reading unit 29 reads the image on a document passing through the nip between this unit and the platen.

The document reader 12 reads the images on both sides of a document as follows.

If the drive controller 1 is instructed by a user to operate in a double-side reading mode, the controller selects the forward control to rotate the motor 2 normally. This makes the pickup roller 22 feed a document to the main conveying path. The separating roller 23 conveys the document forward along the main conveying path. When the document reaches the nip between the conveying roller 24 and driven roller 24B, the sensor unit 28 outputs a sensor signal to the drive controller 1. In response to the sensor signal, the drive controller 1 temporarily selects the reverse control to temporarily rotate the motor 2 reversely. This shifts the pickup roller 22 from the lower position to the upper position. Subsequently, the drive controller 1 selects The ON control to activate the solenoid 3. This inhibits the separating roller 23 and pickup roller 22 from rotating. Thus, it is possible to feed only one document by activating the solenoid 3 after temporarily rotating the motor 2 reversely.

Subsequently, the drive controller 1 selects the forward control again to rotate the motor 2 normally. This makes the conveying roller 24 feed the document forward along the main conveying path. The reading unit 29 reads the image on one side of the document passing through the read position on the main conveying path. Then, the conveying rollers 25 and 26 convey the document forward along the main conveying path.

When a specified time has passed since the sensor unit 28 detected the document, the document passes the connection point between the conveying rollers 25 and 26. Then, the document is nipped between the conveying roller 26 and driven roller 26B. Before the nipped document is discharged from the housing 21, the drive controller 1 selects the reverse control to rotate the motor 2 reversely. This makes the conveying roller 26 convey the nipped document backward along the main conveying path and feed it to the auxiliary conveying path. Then, the conveying roller 25 conveys the document along the auxiliary conveying path toward the connection point between the separating roller 23 and conveying roller 24, feeding it back to the main conveying path. When the document fed back to the main conveying path reaches the nip between the conveying roller 24 and driven roller 24B, the sensor unit 28 outputs another sensor signal to the drive controller 1. In response to this sensor signal, the drive controller 1 selects the forward control to rotate the motor 2 normally. This makes the conveying roller 24 convey the document forward along the main conveying path. The reading unit 29 reads the image on the other side of the document. The conveying roller 25 conveys the document forward along the main conveying path. The conveying roller 26 conveys the document forward along the main conveying path and discharges it from the housing 21.

The document reader 12 reads the image on one side of documents successively as follows.

If the central controller (not shown) of the digital complex system 11 is instructed by a user to operate in a consecutive reading mode, this controller outputs feed instruction signals periodically to the drive controller 1. While the drive controller 1 is receiving feed instruction signals, this controller selects the forward control to rotate the motor 2 normally. This makes the pickup roller 22 feed a document to the main conveying path. The separating roller 23 and conveying roller 24 convey the document forward along the main conveying path. The reading unit 29 reads the image on the document passing the read position on the main conveying path. The conveying roller 25 conveys the document forward along the main conveying path. The conveying roller 26 conveys the document forward along the main conveying path and discharges it from the housing 21.

When the trailing end of a document being fed by the pickup roller 22 leaves the cylindrical surface of this roller, another document comes into contact with the roller surface and is then fed to the main conveying path by the pickup roller 22. The conveying roller 24 conveys the preceding document at the higher speed, pulling it from the nip between the separating roller 23 and pressing plate 23B. Before the preceding document passes the nip between the conveying roller 24 and driven roller 24B, a space is formed between the two documents.

The sensor unit 27 outputs a sensor signal to the drive controller 1 while a document is in contact with this unit. If the sensor unit 27 outputs no sensor signal, the drive controller 1 determines that no document is held in the feed tray 12A. Then, the drive controller 1 terminates the consecutive reading mode.

If the document reader 12 is instructed by a user to stop operating in the consecutive reading mode, the reader 12 operates as follows.

If the central controller (not shown) of the digital complex system 11 stops outputting feed instruction signals to the drive controller 1 in the consecutive reading mode, the drive controller 1 executes a cancel sequence in this mode.

Figure 4:
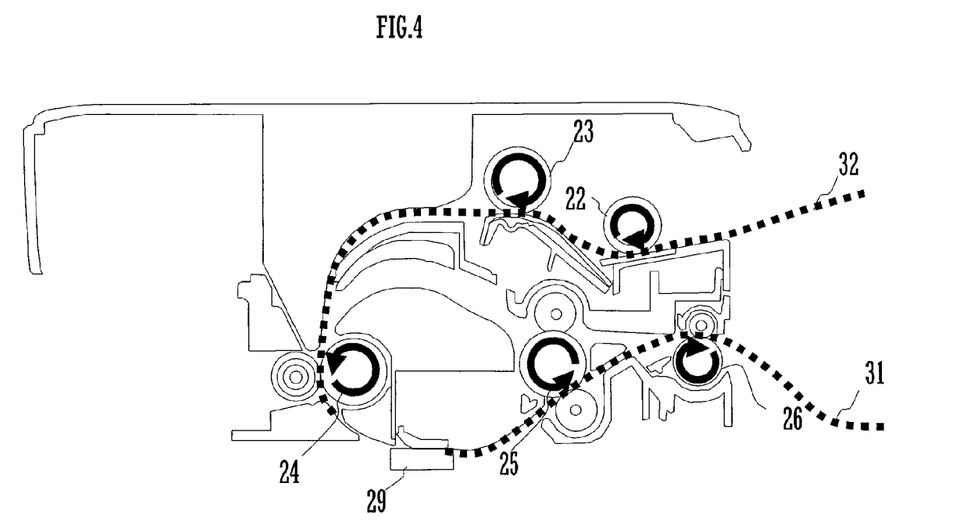
FIGS. 4-10 are schematic sectional views of the document reader, showing the cancel sequence in which the reader operates in a consecutive conveying mode.

When a specified time has passed since the drive controller 1 transferred to the cancel sequence, with the forward control kept selected in the consecutive reading mode, this controller selects the stop control to stop the motor 2 from rotating normally. Specifically, as shown in FIG. 4, the drive controller 1 selects the stop control when a document 31 has passed the read position on the main conveying path, and immediately after the following document 32 reaches the nip between the conveying roller 24 and driven roller 24B (for example, when the leading end of this document is five millimeters ahead of this nip).

The drive controller 1 finds out the distance between the documents 31 and 32 by measuring the time taken for the document 32 to reach the nip between the conveying roller 24 and driven roller 24B since the document 31 passed this nip. The drive controller 1 compares the measured time with a threshold. If the distance between the documents 31 and 32 is not sufficient, the document reader 12 discharges the document 31, and the drive controller 1 executes the cancel sequence for the document 32 and the following document.

Figure 5:
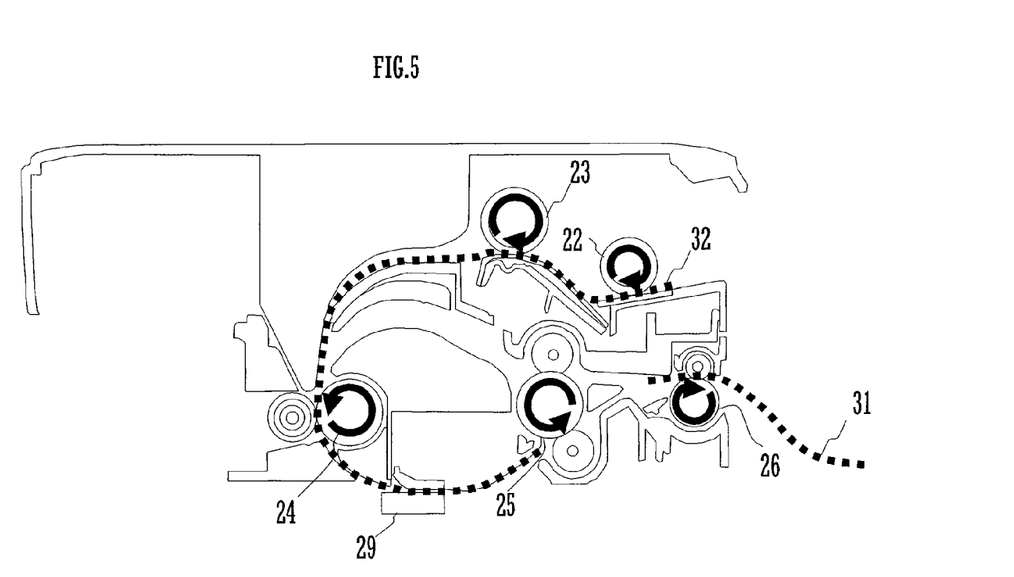

Subsequently, the drive controller 1 selects the forward control to rotate the motor 2 normally again. When a specified time has passed since the drive controller 1 selected the forward control, this controller selects the stop control again to stop the motor 2 from rotating normally. Specifically, as shown in FIG. 5, the drive controller 1 selects the stop control when the document 31 has passed the connection point between the conveying rollers 25 and 26, and immediately before the document 32 reaches the nip between the conveying roller 25 and driven roller 25B (for example, when the leading end of this document is five millimeters behind this nip).

Figure 6:
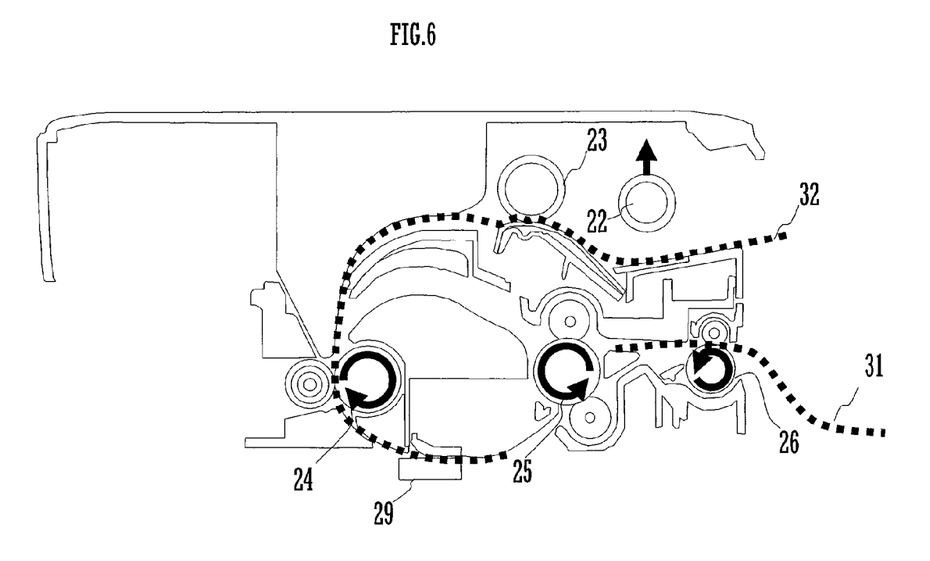

Subsequently, the drive controller 1 temporarily selects the reverse control to rotate the motor 2 reversely. This, as shown in FIG. 6, shifts the pickup roller 22 from the lower position to the upper position, makes the conveying roller 24 convey the document 32 backward along the main conveying path, and also makes the conveying roller 26 convey the document 31 from this path to the auxiliary conveying path. Subsequently, the drive controller 1 selects The ON control to activate the solenoid 3, inhibiting the pickup roller 22 and separating roller 23 from rotating.

When the conveying roller 24 rotates reversely, with the separating roller 23 stopping, the document 32 warps between these rollers. The distance between the rollers 23 and 24 should be long enough to restrain a warping document from wrinkling between them.

After the document 31 passes the connection point between the conveying rollers 25 and 26, it is conveyed backward along the main conveying path and to the auxiliary conveying path, so that this document 31 is not nipped between the conveying roller 25 and driven roller 25B on the main conveying path. This prevents the document 31 from warping and wrinkling between the conveying rollers 25 and 26 on the main conveying path.

Figure 7:
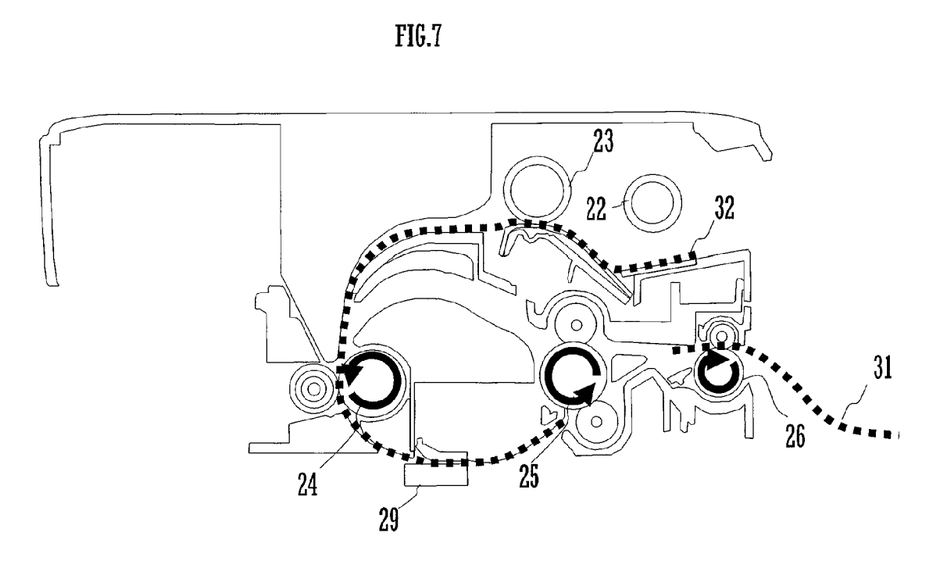

Subsequently, the drive controller 1 selects the forward control again to rotate the motor 2 normally. This, as shown in FIG. 7, conveys the documents 31 and 32 forward and discharges them from the housing 21.

Figure 8:
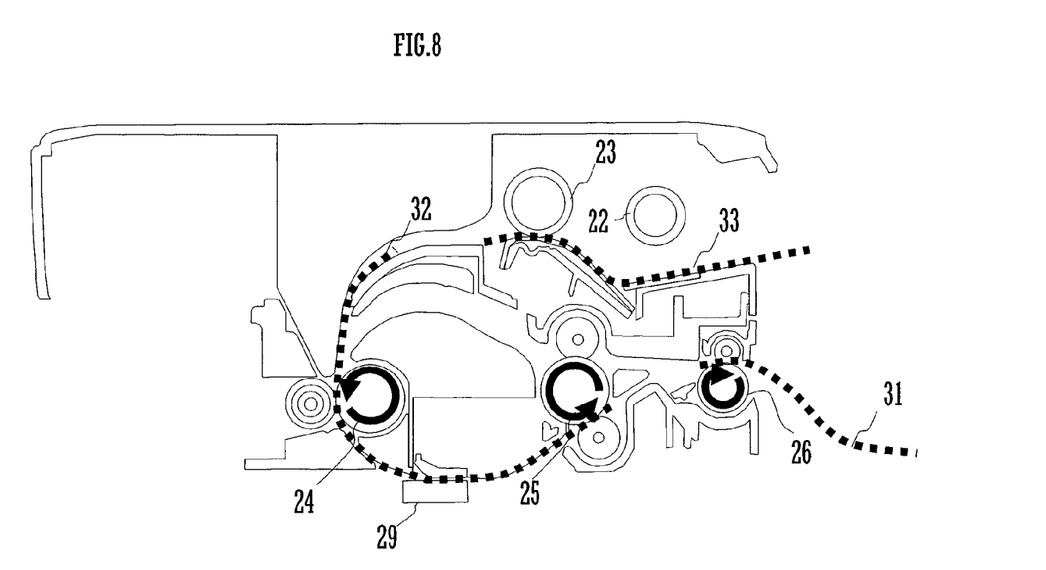

By measuring the time taken for the document 32 to pass the nip between the conveying roller 24 and driven roller 24B since the drive controller 1 started the forward control, this controller finds out the length of the portion of this document 32 which is positioned behind this roller 24. By comparing this measured time with a threshold, the drive controller 1 determines whether the pickup roller 22 has fed a document after this roller feeds the document 32. If the document 32 is the last fed one, the drive controller 1 terminates the cancel sequence. If the document 32 is not the last fed one, the drive controller 1 determines that, as shown in FIG. 8, the following document 33 has been fed to the main conveying path.

Figure 9:
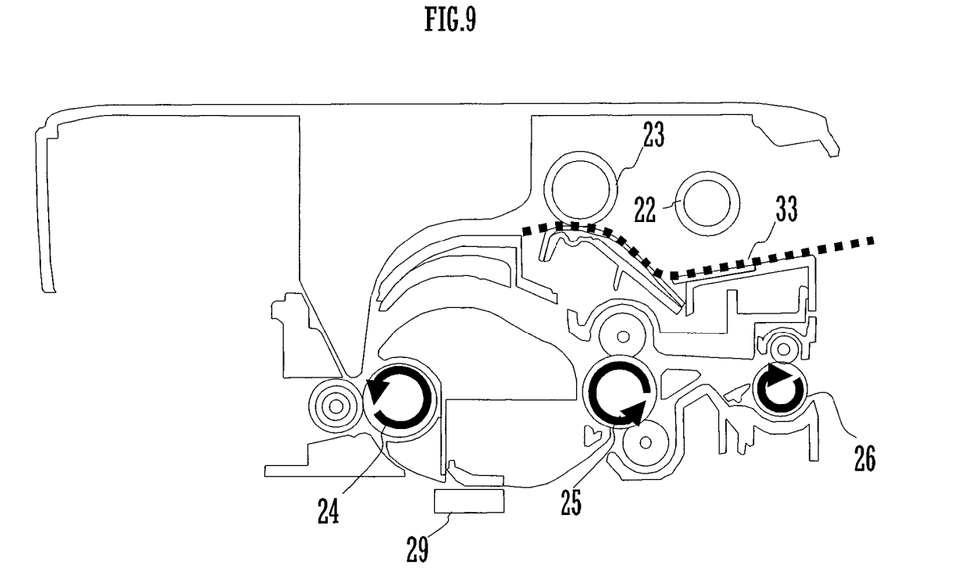

If the document 33 has been fed, the drive controller 1 keeps the forward control selected and, as shown in FIG. 9, discharges the documents 31 and 32 from the housing 21.

After the documents 31 and 32 are discharged, the drive controller 1 selects the stop control to stop the motor 2 and then selects The OFF control to inactivate the solenoid 3.

Figure 10:
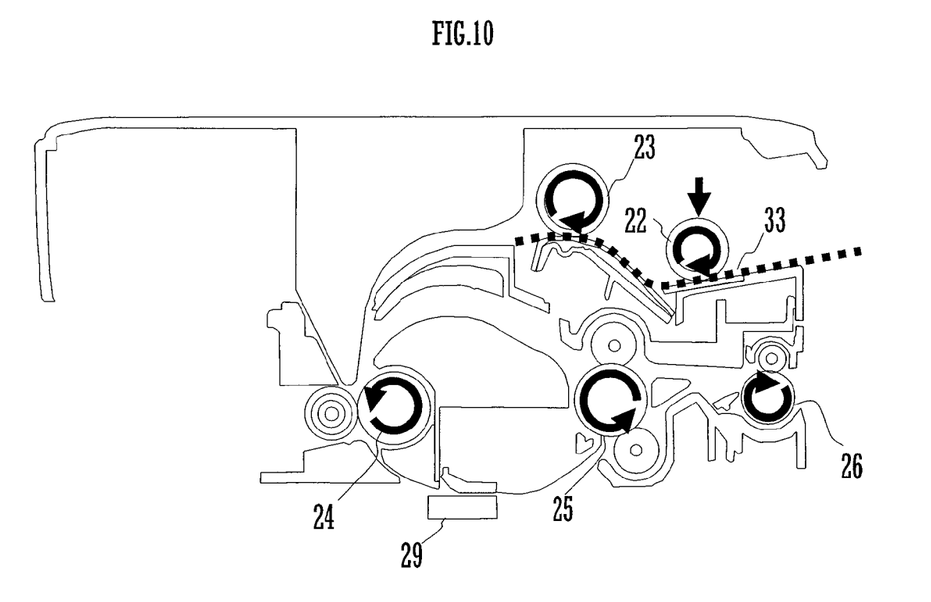

Subsequently, the drive controller 1 selects the forward control to rotate the motor 2 normally. This, as shown in FIG. 10, shifts the pickup roller 22 from the upper position to the lower position and rotates this roller and the separating roller 23 normally. This restarts the conveyance of the document 33.

When the document 33 reaches the nip between the conveying roller 24 and driven roller 24B, the drive controller 1 selects the reverse control temporarily to rotate the motor 2 reversely. This shifts the pickup roller 22 from the lower position to the upper position. Subsequently, the drive controller 1 selects The ON control to activate the solenoid 3, inhibiting the pickup roller 22 and separating roller 23 from rotating. Subsequently, the drive controller 1 selects the forward control to rotate the motor 2 normally. This rotates the conveying rollers 24-26 normally, conveying the document 33 along the main conveying path and discharging it. This ends the cancel sequence.

Thus, the document reader 12 can stop the consecutive reading mode and discharge the documents remaining in the reader when a cancel sequence starts, without damaging them.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A document reader comprising:
   a main conveying path running through a read position between a feed position and a discharge position;
   an auxiliary conveying path running between a first connection point on the main conveying path and a second connection point on the main conveying path, the first connection point being located between the feed position and the read position, the second connection point being located between the read position and the discharge position;
   a drive controller for selecting forward control or reverse control to drive each of rollers having a cylindrical surface located partially on the main conveying path or the auxiliary conveying path;
   a pickup roller having a cylindrical surface;
   the pickup roller being adapted to rotate normally while the forward control is selected with the cylindrical surface located partially in the feed position;
   the pickup roller being adapted to leave the feed position when the reverse control is selected;
   a first conveying roller having a cylindrical surface located partially on the main conveying path between the connection points and partially on the auxiliary conveying path;
   the first conveying roller being adapted to rotate normally while the forward or reverse control is selected; and
   a second conveying roller having a cylindrical surface located partially on the main conveying path between the second connection point and the discharge position;
   the second conveying roller being adapted to rotate normally while the forward control is selected;
   the second conveying roller being also adapted to rotate reversely while the reverse control is selected;
   wherein in a mode in which documents having images are consecutively conveyed and the images on one side are consecutively read, the drive controller being adapted to select the forward control, and to keep the pickup roller rotating normally in the feed position; and
   wherein, when the document reader stops operating in the consecutive conveyance mode, under circumstances in which the second conveying roller is in contact with a first document conveyed along the main conveying path, and simultaneously the first conveying roller is out of contact with both the first document and a second document conveyed along the main conveying path following the first document, the drive controller:
   temporarily switches from the forward control to the reverse control; and
   returns the reverse control to the forward control after inhibiting the pickup roller from feeding a document, and by such switching between the forward control and the reverse control, the document reader discharges the first and second documents.

2. A document reader as claimed in claim 1, further comprising a motor for driving the pickup roller and the conveying rollers.

3. A document reader as claimed in claim 2, further comprising a detector for outputting a detection signal to the drive controller when the detector detects a document passing along the main conveying path;
   wherein, based on the time having passed since the detection signal changed, the drive controller decides when to switch between the reverse control and the forward control.

4. A document reader as claimed in claim 3, wherein, based on the time having passed since the detection signal changed, the drive controller determines whether a document remains on the main conveying path.

5. A document reader as claimed in claim 3, wherein, based on the time having passed since the detection signal changed, the drive controller determines the distance between documents being conveyed along the main conveying path.

* * * * *